United States Patent
Bernot et al.

(10) Patent No.: US 11,722,333 B2
(45) Date of Patent: Aug. 8, 2023

(54) MULTIPLEXING OF SWITCH DATA MIXING NC (NORMALLY CLOSED) AND NO (NORMALLY OPEN) CONTACTS

(71) Applicant: Ratier-Figeac SAS, Figeac (FR)

(72) Inventors: Sylvain Bernot, Montgiscard (FR); Julien Serieys, Lunan (FR)

(73) Assignee: RATIER-FIGEAC SAS, Figeac (FR)

(*) Notice: Subject to any disclaimer, the term of this patent is extended or adjusted under 35 U.S.C. 154(b) by 944 days.

(21) Appl. No.: 16/536,430

(22) Filed: Aug. 9, 2019

(65) Prior Publication Data
US 2020/0153654 A1 May 14, 2020

(30) Foreign Application Priority Data
Nov. 9, 2018 (EP) .................................. 18306476

(51) Int. Cl.
*H04L 12/40* (2006.01)
*G05G 9/047* (2006.01)
*H01H 25/04* (2006.01)

(52) U.S. Cl.
CPC ....... *H04L 12/40039* (2013.01); *G05G 9/047* (2013.01); *H01H 25/04* (2013.01)

(58) Field of Classification Search
CPC . H04L 12/40039; B64C 13/042; G05G 9/047; H01H 25/04
See application file for complete search history.

(56) References Cited

U.S. PATENT DOCUMENTS

| | | | | |
|---|---|---|---|---|
| 3,947,664 A | * | 3/1976 | Cox | G01C 22/02 377/50 |
| 5,225,831 A | * | 7/1993 | Osborn | H01H 25/04 341/20 |
| 5,854,458 A | | 12/1998 | Ramamurthy et al. | |
| 6,288,652 B1 | | 9/2001 | Bedi et al. | |
| 6,377,239 B1 | | 4/2002 | Isikawa | |
| 7,093,050 B2 | | 8/2006 | Niklasson | |
| 9,497,054 B1 | * | 11/2016 | Li | H04L 25/0264 |
| 2004/0133316 A1 | * | 7/2004 | Dean | G05D 1/027 701/23 |
| 2007/0260394 A1 | * | 11/2007 | Dean | G05D 1/0272 901/1 |
| 2009/0134890 A1 | | 5/2009 | Johnson | |
| 2014/0091181 A1 | * | 4/2014 | Ouellette | G05G 13/00 244/221 |
| 2019/0341931 A1 | * | 11/2019 | De La Bardonnie | H03M 1/785 |
| 2021/0333806 A1 | * | 10/2021 | Urbanec | B64C 13/16 |

FOREIGN PATENT DOCUMENTS

WO 2018087353 A1 5/2018

OTHER PUBLICATIONS

Extended European Search Report for International Application No. 18306476.5 dated Jan. 25, 2019, 9 pages.
Brazilian Office Action for BR Application No. BR102019013829-7, dated Mar. 21, 2023, pp. 1-4.
English Translation of BR Brazilian Office Action for BR Application No. BR102019013829-7, dated Mar. 21, 2023, 2 pages.

* cited by examiner

*Primary Examiner* — Stephen J Clawson
(74) *Attorney, Agent, or Firm* — Cantor Colburn LLP

(57) ABSTRACT

A multiplexer switching device is described herein comprising a first data network comprising a plurality of NO contacts; and a second data network comprising a plurality of NC contacts; wherein said a first data network is connected to said second data network via a common DC voltage link.

7 Claims, 5 Drawing Sheets

MULTIPLEXING OF SWITCH DATA MIXING NC (NORMALLY CLOSED) AND NO (NORMALLY OPEN) CONTACTS

FOREIGN PRIORITY

This application claims priority to European patent application no. 18306476.5 filed Nov. 9, 2018, the entire contents of which is incorporated herein by reference.

FIELD

The present disclosure relates to a switching device. The switching devices described herein may be used in many applications, including but not limited to side sticks for helicopters.

BACKGROUND

In the cockpit area of a helicopter, a joystick may be used by the pilot as a controller to manipulate the flight controls. The joystick is often located on the side console of the pilot and so may also be referred to as a side stick.

The upper part of the side stick that is accessible to the pilot has many switches which are connected to an electronics system(s) that is located at the bottom of the stick or elsewhere. Due to this, the side stick may contain many wires.

It is therefore conceivable to multiplex the information transmitted by the switches in a side stick in order to reduce the number of wires therein. Current architectures for multiplexing of switch data include in-line data networks and matrix-type data networks with a single switch contact type (e.g. with either a normally closed nc or normally open no contact).

U.S. Pat. No. 7,093,050 B2 describes a network control arrangement including at least one common bus. An input member and an output member are connected to the common bus and the input member is adapted to receive an input signal through at least one input contact. The output member is adapted to provide an output signal through at least one output contact.

U.S. Pat. No. 6,288,652 B1 describes a digitally encoded keyless entry keypad switch. U.S. Pat. No. 5,854,458 describes a multi-function switch assembly for mounting to the end of a tubular member. US 2009/0134890 A1 describes a switching interface for use in a vehicle.

WO 2018087353 A1 describes a device for encoding information between a plurality of NC switches. The NC switches are connected in series between a voltage line and a measuring line.

SUMMARY

A multiplexer switching device is described herein comprising a first data network comprising a plurality of NO contacts; and a second data network comprising a plurality of NC contacts; wherein said first data network is connected to said second data network via a common DC voltage link.

In the examples described herein the first and second data network may be connected via a single common DC voltage link.

In some examples, each of the NO contacts of the first data network may be connected to a resistor.

In some examples, each of the NC contacts of the second data network may be connected to a resistor.

In some examples, the resistor or resistors may have a value that is selected so that equivalent impedance is specific to each configuration case of the contact activations.

In some examples, the device may comprise a power supply that is configured to provide a current to the first and second data networks through the common DC voltage link.

In some examples, the device of claim the first data network may comprise four NO contacts.

In some examples, the second data network may comprise four NC contacts.

In some examples the switching device may be a four-direction switching device.

In some examples each of said four directions of said four-direction device comprises one NO contact and one NC contact.

In some examples each of said four directions of said four-direction device is connected to said common DV voltage link by three wires.

The devices described herein may be used in a side stick for a helicopter. The devices may alternatively be used in other applications.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
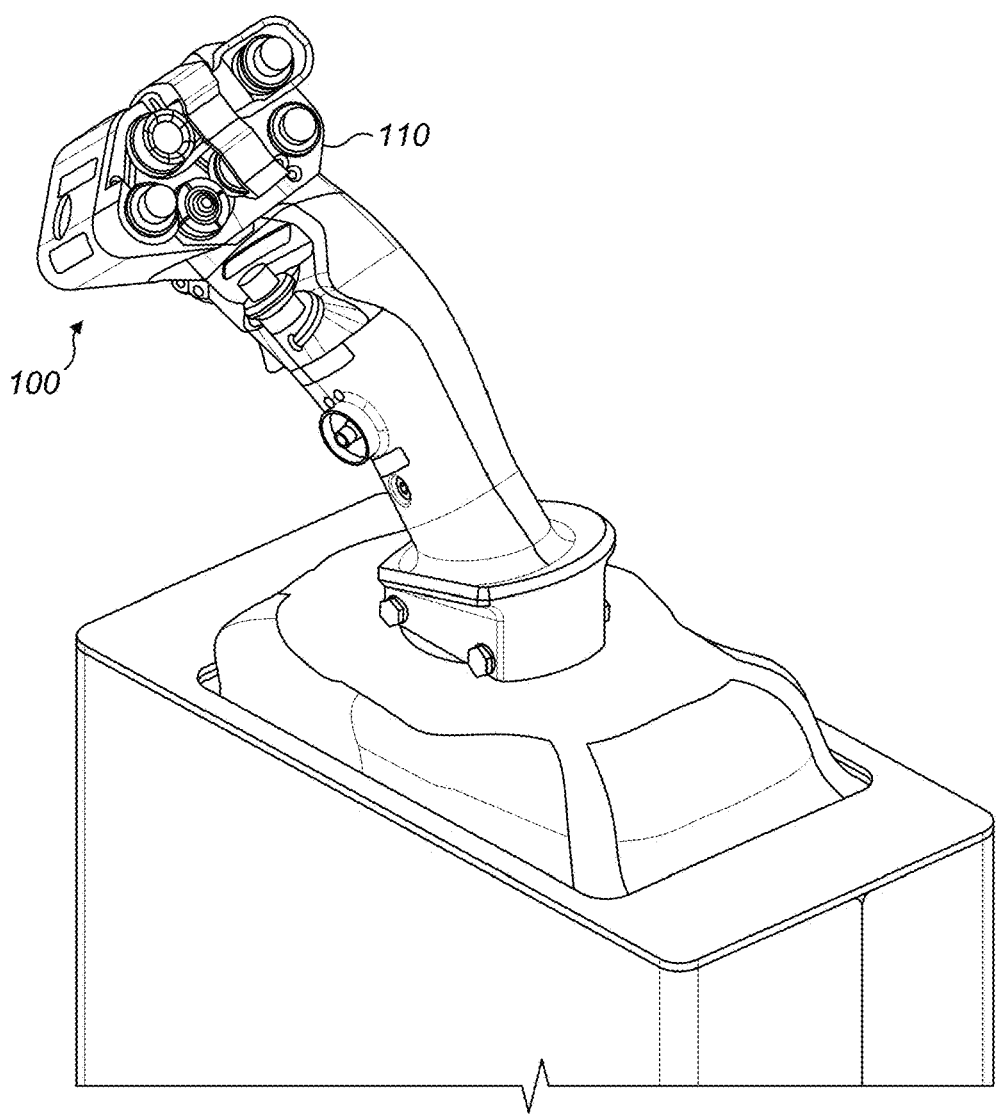
FIG. 1 illustrates an example of a side stick for use in a helicopter.

The examples described herein may be used in a side stick 100 for a helicopter, such as that depicted in FIG. 1. In some examples, the side stick may be an Airbus Helicopters X6 helicopter cyclic side stick unit. The grip area containing the switches is depicted by reference numeral 110.

Although known systems for switch data multiplexing include architectures comprising in-line data networks and matrix-data type data networks, these systems have only ever been used in combination with one type of single switch contact, i.e. either with a normally closed (NC) or normally open (NO) contact. The examples described herein, however, are different to these known systems in that, within one switch, they mix the use of both NC and NO contacts with data networks and provide two output signals.

A switching device 300 is described herein that defines a system that is configured to detect the default state and the combination of single or multiple activations of switch contacts. This new example of a switch may include n poles with two contact types: NC and NO contacts as shown in FIG. 2.

Figure 2:
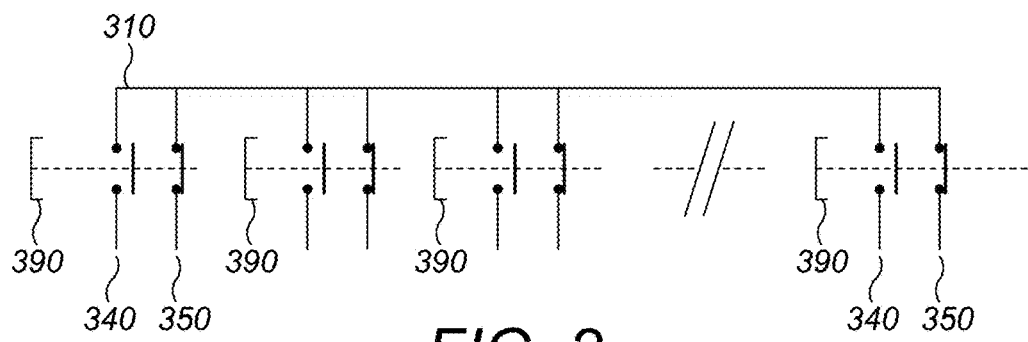
FIG. 2 illustrates a new type of switch architecture as described herein.
Figure 3:
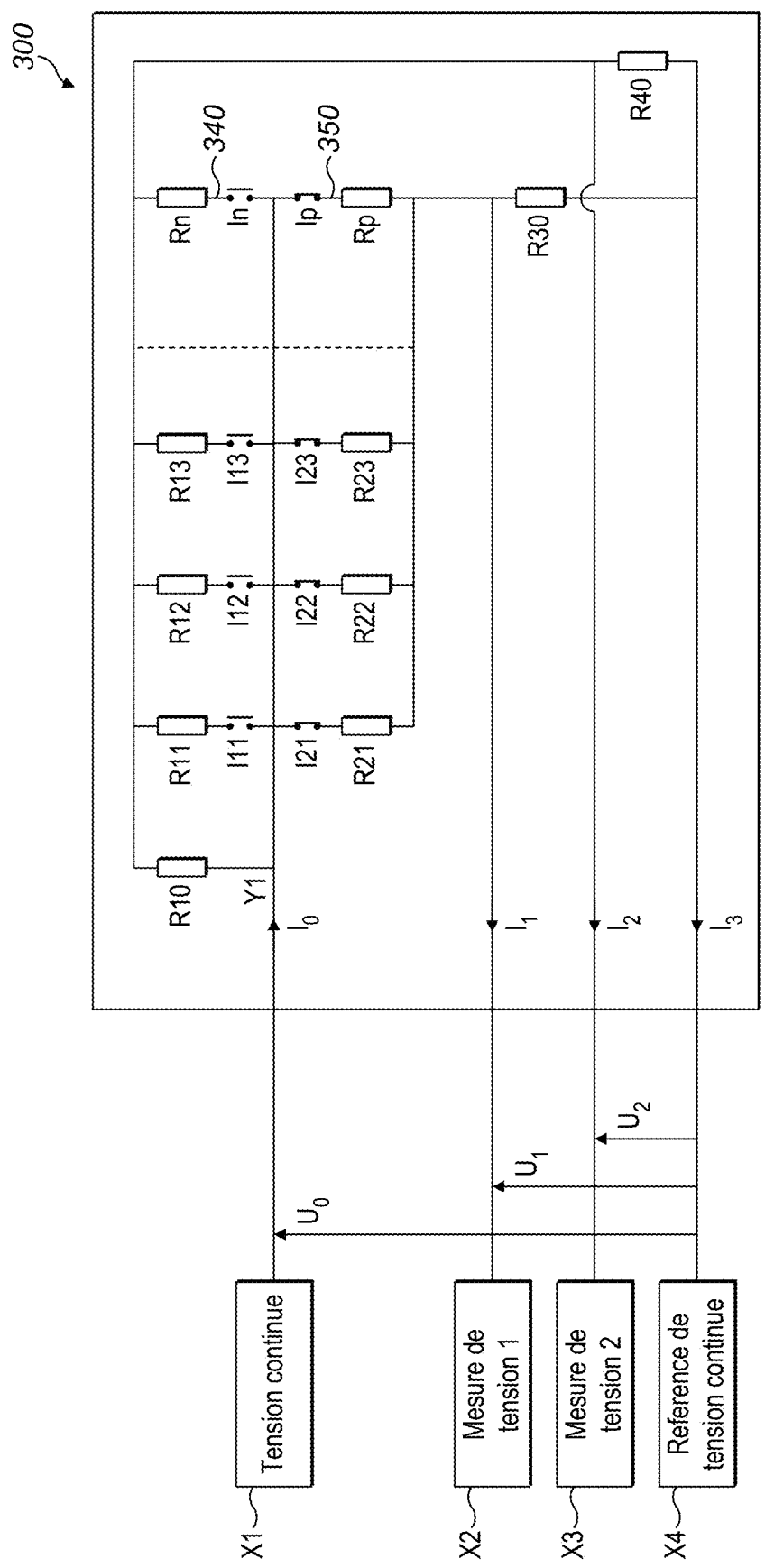
FIG. 3 depicts the circuit diagram of a switching device as described herein.

As can be seen in FIGS. 2 and 3, the device 300 includes two data networks 340, 350, one for the NO contacts (l11, l12, l13 to ln) 340, as shown in FIGS. 2 and 3, and another for NC contacts (l21, l22, l23 to lp) 350. The first data network 340 has a plurality of NO contacts connected in parallel to each other and the second data network 350 has a plurality of NC contacts connected in parallel to each other. These two data networks 340, 350 are connected in series to each other by a common DC voltage link 310, and each of the individual NO contacts is electrically connected to a respective one of the individual NC contacts. Reference numeral 390 as shown in the figures represents a mechanical toggle.

As can be seen in FIG. 3, a DC voltage X1 may be applied to the switching device 300 along an electrical connection that comprises this common DC voltage link 310. That is, the common DC voltage link 310 provides DC voltage to both of the data networks 340, 350 simultaneously.

Each of the individual NC and NO contacts is also connected to and paired with a resistor R. The resistor R is provided at the side opposite to the common DC voltage link 310. As can be seen in FIG. 3, an individual NC contact is electrically connected, across said common DC voltage link 310, in series to an individual NO contact, so that the NC contact and NO contact are adjacent to each other and positioned either side of this common DC voltage link 310. The use of this common DC voltage link 310 provides the benefit that the amount of wires needed by the switching device 300 can be reduced.

In some of the examples described herein, a four direction switch is used which has four NC and four NO contacts. The contacts may be wired into a specific data network so that data can be multiplexed on fewer wires or signals.

As can be seen in FIG. 3, each of the parallel connections comprises, arranged in series, a first resistor R electrically connected to an NO contact, which is electrically connected so as to extend across the common power link 310 to an NC contact. The NC contact is then connected electrically to a second resistor.

The resistor R10, R11, R12, R13 to Rn values of the first data network (i.e. the NO network) may be selected so that equivalent impedance is specific to each configuration case of the NO contact activations.

Similarly, the resistor R21, R22, R23 to Rp values of the second data network (i.e. the NC data network) may also be selected so that equivalent impedance is specific to each configuration case of NC contact activations.

The DC voltage power supply X1 is used to provide a current to the first 340 and second data networks 350 through the common DC voltage link 310 that is linked to each contact as described above.

Static loads R30, R40 may also be electrically connected to the data networks and may induce a specific voltage (i.e. a function of the power supply voltage) in relation to each configuration case of the switch contacts. The load on the NC data network provides a measurable voltage X2 which is representative of the states of the NC contacts. The load on the NO data network provides a measurable voltage X3 which is representative of the states of the NO contacts.

The DC power supply voltage U0 and measured voltages U1, U2 (with U1 being the voltage of the NC matrix 350 and U2 corresponding to the voltage of the NO matrix) are referenced to the same electrical point X4. In some examples, a feedback of the power voltage U0 could therefore be provided to adapt (dynamic adaptation) the U1 and U2 voltage ratios in relation to the U0 power voltage. This method prevents the system effect of U0 power voltage variations and transients. Multiple contact activation combinations representative of switch failure may produce close or equal equivalent impedance (see FIGS. 4 and 5) into a data network. One aim of the device described herein is to detect the default state and the single activation states of the switch contacts from the fault states (multiple activations of switch contacts) as shown in FIGS. 4 and 5.

Figure 4:
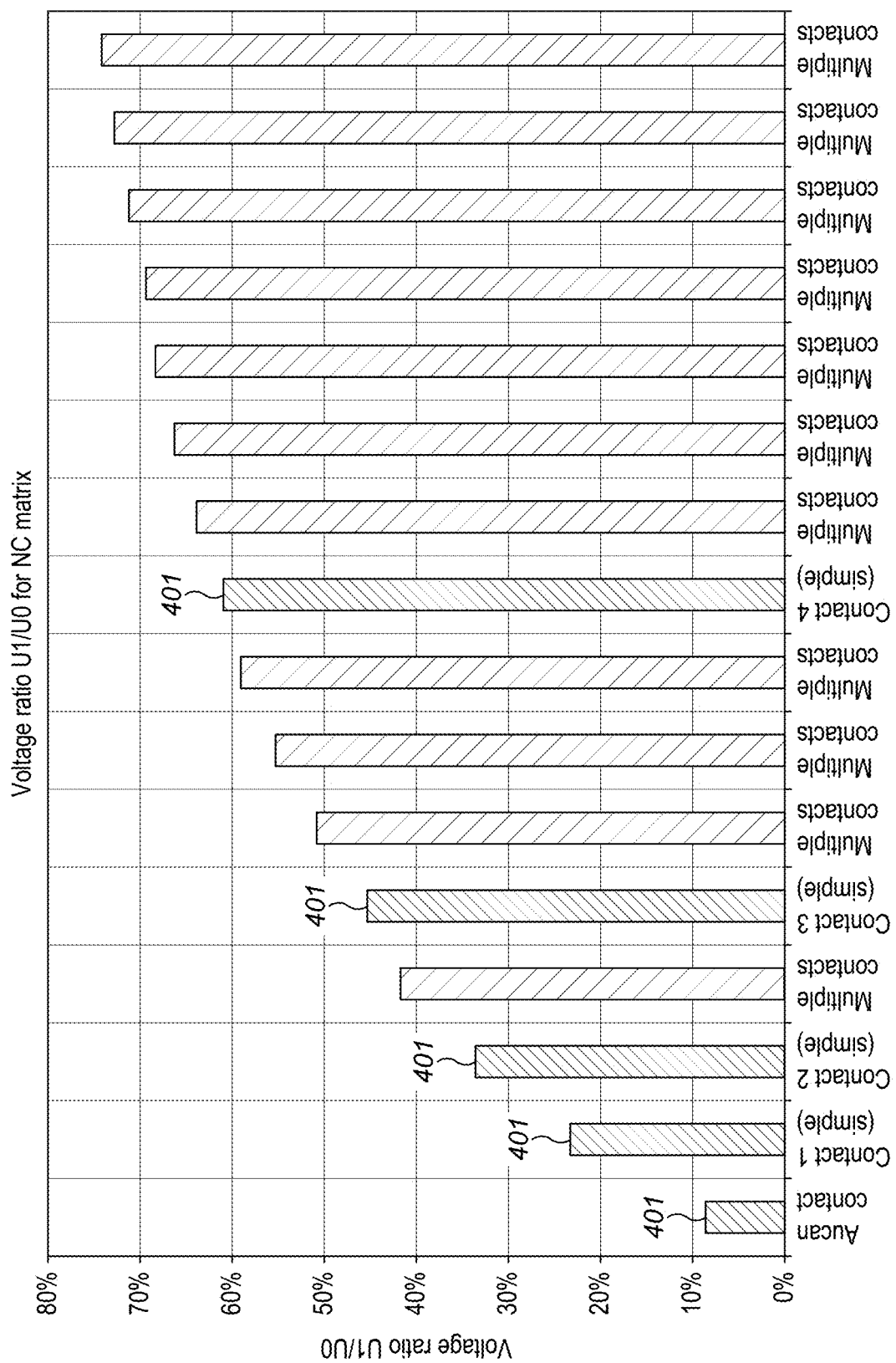
FIG. 4 depicts an example of voltage measurements for a NC data network, with the ratio U1/U0.
Figure 5:
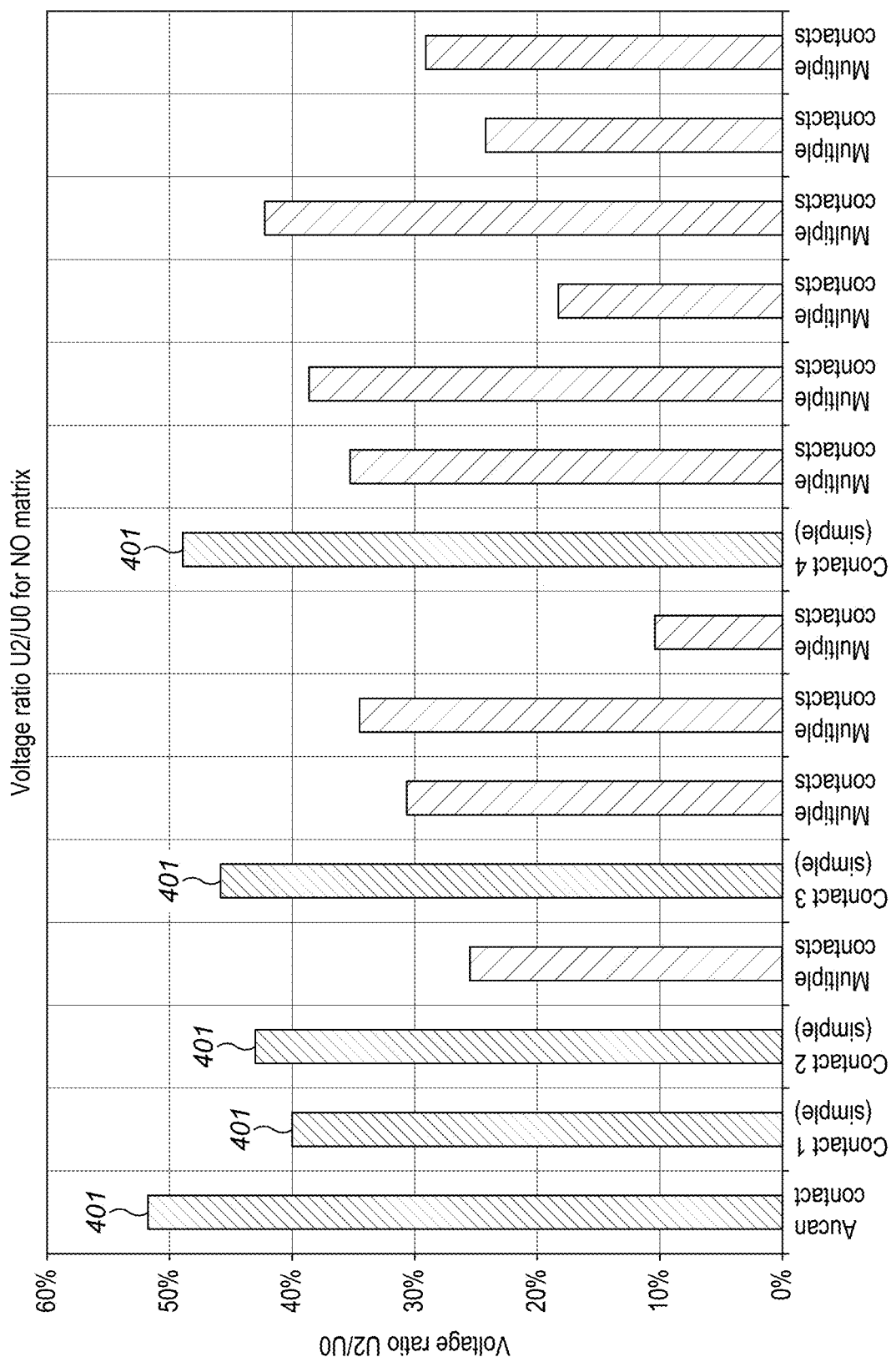
FIG. 5 depicts a further example of voltage measurements for a NC data network, with the ration U2/U0

FIG. 4 shows the ratio U1/U0 and FIG. 5 shows the ratio U2/U0. FIGS. 4 and 5 therefore show examples of measured voltages for a 4 poles switch with 2 contact types. The default state and single activation states of the switch contacts are referenced as 401 while the fault cases (multiple activations of switch contacts) are the remaining states.

The examples described herein have benefits in that, when used in a side stick for a helicopter, the amount of wires required between the grip of the side stick unit and the base can be reduced. Since the grip includes several different switches with multiple contacts of both NO and NC type, the multiplexing of information can be made via fewer signals, meaning fewer wires.

For known switches, when using a simple interface with discrete signals, a switch with four NC contacts and four NO contacts would therefore require 12 wires (between the grip and the base of the side stick unit). With two independent matrices it would induce the use of double poles switches. As there is no common point between the two throws it would be necessary to have two electrical segregated poles (instead of double throws) so there would be 8 wires (between the grip and the base of the side stick unit).

Figure 6:
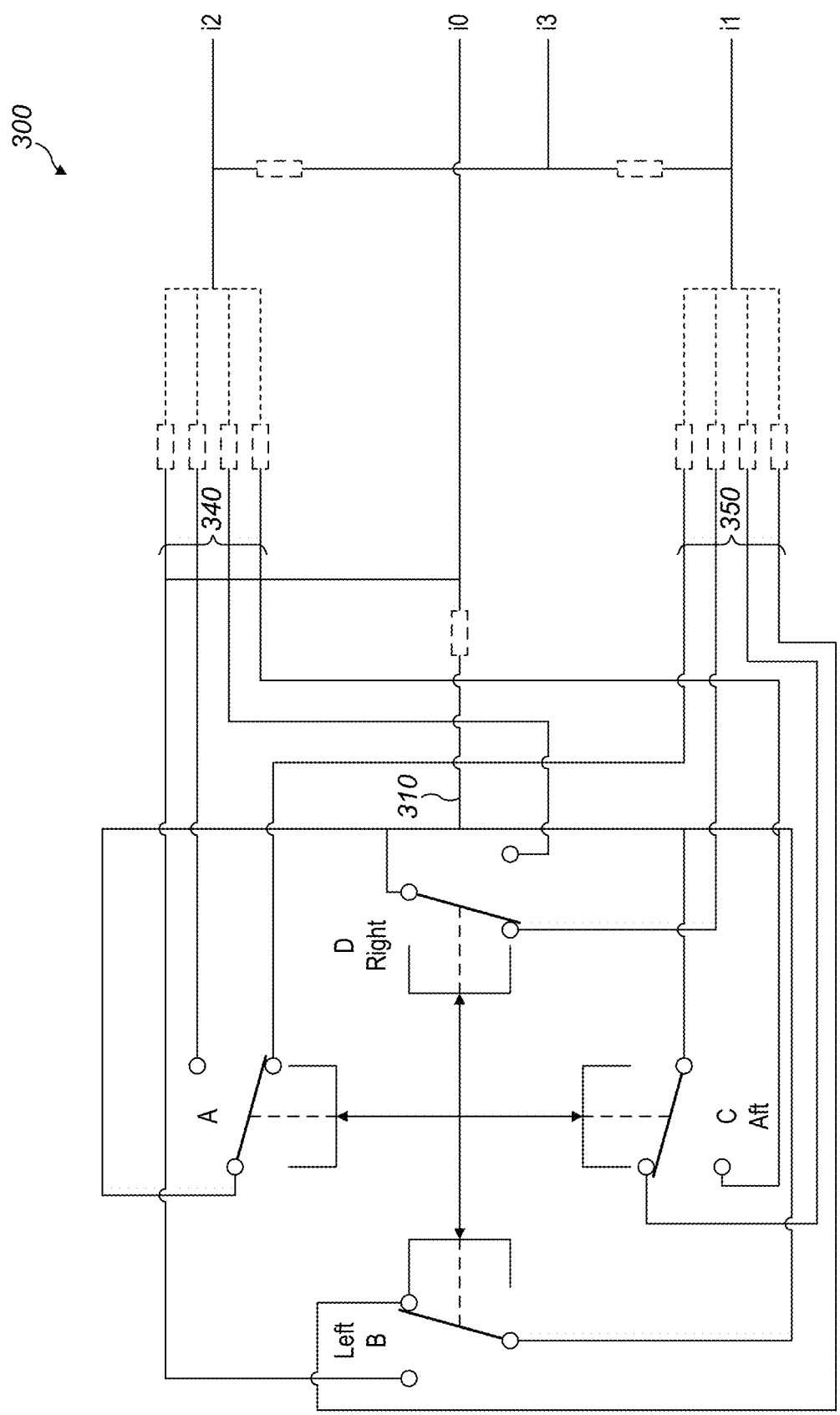
FIG. 6 depicts a four direction switching device that may comprise the examples described herein.

In the examples described herein, however, when a four direction switch is used which has four NC and four NO contacts, the common power link 310 provides power to four different switch directions. This is depicted in FIG. 6. The contacts may be wired into a specific data network so that data can be multiplexed on fewer wires or signals. By using the mixed matrices shown in FIG. 6, the new examples described herein can use double throw switches despite there only being 4 wires (between the grip and the base of the side stick unit) and only one DC power supply.

This four-direction switch therefore comprises one DC voltage power supply which provides the common power link 310 for four switching directions. Each switching direction comprises an NO contact (which is part of the first data network) and an NC contact (which is part of the second data network). For each switching direction, only three electrical wires are needed to connect to the DC voltage power supply.

In use in a helicopter side stick, the user may push/pull the stick forward, back, left or right (A, B, C, D as shown in FIG. 6).

The invention claimed is:

1. A multiplexer switching device comprising:
a first data network comprising a plurality of normally open (NO) contacts; and
a second data network comprising a plurality of normally closed (NC) contacts; wherein:
said first data network is connected to said second data network via a common DC voltage link;
each of said NO contacts is electrically connected to a respective one of said NC contacts;
the common DC voltage link provides DC voltage to both of the first and second data networks simultaneously;
each of the individual NC and NO contacts is connected to and paired with a resistor R, wherein said resistors have values that are selected so that equivalent impedance is specific to each configuration case of contact activations, and said multiplexer switching device is mountable in a side stick for a helicopter;
wherein said switching device is a four-direction switching device.

2. The device of claim 1, wherein said first data network comprises four NO contacts.

3. The device of claim 1, wherein said second data network comprises four NC contacts.

4. The device of claim 1, wherein each of said four directions of said four-direction device comprises one NO contact and one NC contact.

5. The device of claim 1, wherein each of said four directions of said four-direction device is connected to said common DV voltage link by three wires.

6. The device of claim 1, further comprising a power supply (X1) configured to provide a current to the first and second data networks through said common DC voltage link.

7. A side stick for a helicopter comprising:
the device of claim 1.

* * * * *